United States Patent
Yamasaki et al.

(10) Patent No.: US 6,776,903 B2
(45) Date of Patent: Aug. 17, 2004

(54) SYSTEM FOR WASTE WATER TREATMENT CAPABLE OF SAVING ENERGY AND REDUCING SUSPENDED SOLIDS

(75) Inventors: Kazuyuki Yamasaki, Hiroshima (JP); Kazumi Chujo, Ayauta-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 102 days.

(21) Appl. No.: 09/956,112

(22) Filed: Sep. 20, 2001

(65) Prior Publication Data

US 2002/0100730 A1 Aug. 1, 2002

(30) Foreign Application Priority Data

Jan. 31, 2001 (JP) ........................................ 2001-023528

(51) Int. Cl.$^7$ ................................................ C02F 3/28
(52) U.S. Cl. .................... 210/199; 210/202; 210/203; 210/207; 210/253; 210/151
(58) Field of Search .............................. 210/150, 151, 210/199, 202, 203, 205, 207, 253

(56) References Cited

U.S. PATENT DOCUMENTS

| 5,480,537 A | * | 1/1996 | Yamasaki et al. | .......... 210/96.1 |
| 5,702,604 A | * | 12/1997 | Yamasaki et al. | .......... 210/603 |
| 5,788,838 A | * | 8/1998 | Yamasaki et al. | .......... 210/150 |
| 5,804,076 A | * | 9/1998 | Yamasaki et al. | .......... 210/609 |
| 6,056,876 A |   | 5/2000 | Yamasaki et al. | .......... 210/617 |

FOREIGN PATENT DOCUMENTS

| JP | 09-314163 | 12/1997 |
| JP | 10-314778 | 12/1998 |

* cited by examiner

Primary Examiner—Peter A. Hruskoci
(74) Attorney, Agent, or Firm—Nixon & Vanderhye P.C.

(57) ABSTRACT

In this waste-water treatment system, solids suspended in waste water are attached to a radial ring-shaped thread structure 6 filled in an attachment filter tank 2. Then, particle sizes are increased and the attached solids are further made to be anaerobic, digested and reduced. Then, sludge generated from the suspended solids is sedimented, separated and removed in a sedimentation section 3 in the same attachment filter tank 2. In this waste-water treatment system, solids suspended in waste water can be filtered without consuming a large amount of electrical energy. Thus, energy can be saved and waste can be reduced.

16 Claims, 16 Drawing Sheets

Fig. 5A  A CASE WHERE THE SUSPENDED SOLID CONCENTRATION IN WASTE WATER IS NORMAL :

| NAME OF TANK | RESIDENCE TIME | TIMING (TIME LAPSE) | | | | | | | |
|---|---|---|---|---|---|---|---|---|---|
| | | 0.5 | 1.0 | 1.5 | 2.0 | 2.5 | 3.0 | 3.5 | 4.0 |
| ATTACHMENT FILTER TANK HAVING A SEDIMENTATION SECTION | 2HR. | ■■■■■■■ | | | | | | | |
| PIT | 0.5HR. | | | | | ■ | | | |
| RAPID FILTER | 0.5HR. | | | | | | ■ | | |
| PIT | 0.5HR. | | | | | | | ■ | |

Fig. 5B  A CASE WHERE THE SUSPENDED SOLID CONCENTRATION IN WASTE WATER IS LOW :

| NAME OF TANK | RESIDENCE TIME | TIMING (TIME LAPSE) | | | | | | | |
|---|---|---|---|---|---|---|---|---|---|
| | | 0.5 | 1.0 | 1.5 | 2.0 | 2.5 | 3.0 | 3.5 | 4.0 |
| ATTACHMENT FILTER TANK HAVING A SEDIMENTATION SECTION | 1HR. | ■■■ | | | | | | | |
| PIT | 0.5HR. | | | ■ | | | | | |
| RAPID FILTER | 0.5HR. | | | | | ■ | | | |
| PIT | 0.5HR. | | | | | | ■ | | |

SYSTEM FOR WASTE WATER TREATMENT CAPABLE OF SAVING ENERGY AND REDUCING SUSPENDED SOLIDS

BACKGROUND OF THE INVENTION

The present invention relates to a system and method for waste water treatment wherein energy saving and reduction of suspended solids by digestion can be achieved. The present invention also relates to a waste-water treatment system constituted by solely using an attachment filter having a sedimentation section or combining an attachment filter and a rapid filter. The present invention further relates to a waste-water treatment system capable of performing a highly efficient treatment of organic matters and an advanced treatment of suspended solids (two-stage filtration).

In an age of global environmental protection, an important issue for any company is how to reduce various wastes generated in its operation centers.

Furthermore, reduction of waste has become a recent important issue from viewpoints of recent reduction of the number of disposal sites and recent efforts towards zero emission by various companies.

Similarly, an issue of sludge generated from waste-water treatment equipment is also being grappled with in various manners.

Solids suspended in waste water is filtered until its amount falls in a range of regulation values or removed by coagulating sedimentation using a chemical or the like. Therefore, sludge is generated after the treatment.

Conventionally, a rapid filter as a filter employed in a common waste-water treatment system is composed of a water-conveying pump and backwash pump. Power consumption was high, in particular, due to a long running time of the water-conveying pump.

However, energy saving measures for the equipment has become so important today that it has become necessary to thoroughly plan and implement energy saving in the waste-water treatment system as well.

However, as long as the rapid filter is used, energy saving measures relevant to pumps for use in the rapid filter have approached their limit, thereby making energy saving substantially difficult. Furthermore, the rapid filter does not have a function for digesting and reducing suspended solids in waste water.

On the other hand, a biological filter consumes a relatively little electrical energy. However, there were cases microorganisms exfoliated from the biological filter deteriorated water quality.

One example of such conventional techniques having a biological filter (Japanese Patent Laid-Open Publication HEI 9-314163) is described below. This conventional technique provides a waste-water treatment system wherein waste water is introduced into a charcoal tank filled with charcoal for treatment and then the waste water from this charcoal tank is introduced into an activated carbon tower filled with activated carbon for treatment.

Since microorganisms are propagated in both the charcoal in the charcoal tank and the activated carbon in the activated carbon tower, these are called biologically activated charcoal and biologically activated carbon, respectively. This two-stage treatment by the biologically activated charcoal and the biologically activated carbon has a merit that a backwash process and a reproduction process in the activated carbon tower are not required. Consequently, the life of the activated carbon can be substantially extended.

Since a biofilm is also formed on the surface of the biologically activated charcoal and waste water constantly circulates in a water tank by aeration, aerobic biofilm filtration is performed by the biologically activated charcoal. That is, biological filtration is constantly performed. Although charcoal is also a packing material, anaerobic digestion of sludge by microorganisms cannot be expected since the central portion does not have a considerably large anaerobic portion unlike a vinylidene chloride filler. Furthermore, since charcoal is not negatively charged, a large amount of suspended floc and suspended microorganisms cannot be attached and held to charcoal unlike a vinylidene chloride filler. Therefore, the above conventional technique (Japanese Patent Laid-Open Publication HEI 9-314163) does not have a remarkable effect on reduction of the generated sludge.

Another example of conventional techniques (Japanese Patent Laid-Open Publication HEI 10-314778) is described below. This conventional technique provides a waste-water treatment system wherein suspended solids are captured and removed and decomposition of organic matters by microorganisms can be sufficiently performed. Specifically, this system is constituted by an oxygen supply tank having a diffusing pipe installed at a bottom section thereof, a carrier attachment filter tank filled with fillers and a wash water discharge pump tank equipped with a wash water discharge pump. Furthermore, a diffusing pipe is installed at the bottom section of the carrier attachment filter tank and granular carriers as fillers are filled thereabove.

In this waste-water treatment system, suspended solids can be attached and removed or organic matters in waste water can be removed by microorganisms propagated on the packing material. However, since there is no anaerobic portion, digestion of attached suspended solids or propagated microorganisms (that is, reduction of generated sludge) cannot be expected. Furthermore, since a rapid filter is not installed after the carrier attachment filter tank, a sufficient measure is not taken when sludge exfoliates from the carrier attachment filter tank.

SUMMARY OF THE INVENTION

Accordingly, the object of the present invention is to provide a system and method for waste water treatment that can save energy and reduce waste.

In order to achieve the above object, there is provided a waste-water treatment system comprising an attachment filter having a packing material to which suspended solids are attached and a sedimentation section in a bottom section thereof, wherein solids suspended in waste water are treated by sedimenting the solids attached to the packing material in the sedimentation section.

In the present invention, solids suspended in waste water are attached to the packing material in the attachment filter and then particle sizes are increased (particles are stacked to each other and are enlarged). Then, the solids attached in an anaerobic state are digested and reduced. Furthermore, sludge generated from the suspended solids is sedimented, separated and removed in the same attachment filter tank. In the present invention, since solids suspended in waste water can be treated by the attachment filter having a sedimentation section, solids suspended in waste water can be filtered without consuming a large amount of electrical energy. Furthermore, the generated sludge is sedimented in the sedimentation section and removed from this sedimentation section. Thus, waste water can be treated.

When microorganisms are attached and propagated on the packing material provided in the attachment filter, a function for decomposing organic matters is provided and the packing material itself has an attachment action. Therefore, a function for attaching solids suspended in waste water to this packing material for filtration is provided.

The above "attachment filter" means a filter wherein suspended solids such as a floc suspended in waste water or suspended microorganisms are attached and captured by a packing material carrying negative charges. The "attachment filter having a sedimentation section" means a device having both sedimenting and attaching functions.

In one embodiment of the present invention, the sedimentation section has a sludge collecting function for collecting sedimented sludge.

According to the above embodiment, the sedimentation section has a sludge collecting function. Therefore, after increase of particle sizes, specific gravity is changed by digestion and thereby sedimented sludge can be efficiently collected in the sedimentation section. Therefore, waste water in which a large amount of sludge is generated can also be treated by the sedimentation section having a sludge collecting function.

In one embodiment of the present invention, a rapid filter is installed in a subsequent stage of the attachment filter; and
solids suspended in waste water are treated first in the attachment filter and then filtered by the rapid filter.

According to the above embodiment, solids suspended in waste water are treated first in the attachment filter and then filtered by the rapid filter. Therefore, the filtering precision can be improved by performing two-stage filtration as compared with one-stage filtration. That is, there is provided a system capable of reducing suspended solids, that is, sludge, and reliably removing the suspended solids, which is digested and reduced, at the same time (combination of an attachment filter having a sedimentation section and a rapid filter) According to the present invention, precise filtration can be reliably performed at all times. Furthermore, genesis sludge capacity is small since the attachment filter is in the previous stage, wherein sludge is digested.

In one embodiment of the present invention, a rapid filter is installed in parallel to the attachment filter; and
solids suspended in waste water are treated in the attachment filter and the rapid filter in parallel.

In this embodiment, since solids suspended in waste water are treated by (1) an attachment filter having a sedimentation section and (2) a rapid filter, which are disposed in parallel, the filters can be selected and operated according to target water quality (suspended solids).

Since the suspended solid concentration in treated water obtained from the rapid filter is lower than the suspended solid concentration in treated water obtained from the attachment filter having a sedimentation section, the target suspended solid concentration after treatment can be set by adjusting inflow of waste water into the attachment filter and the rapid filter.

In one embodiment of the present invention, the attachment filter has a radial ring-shaped thread structure composed of a plurality of radially extending ring-shaped bodies as the packing material.

In this embodiment, since the attachment filter having a sedimentation section has a radial ring-shaped thread structure, solids suspended in waste water can be attached to this radial ring-shaped thread structure and then digested, thereby reducing the genesis sludge capacity.

Since the radial ring-shaped thread structure is a thread-like packing material, the surface area is markedly large and thus suspended solids and microorganisms are easily attached thereon. Therefore, microorganisms are easily propagated and organic matters can also be treated. Furthermore, oxygen is not spread in the central portion of the radial ring-shaped thread structure, anaerobic microorganisms are propagated and can digest attached suspended solids.

In one embodiment of the present invention, the material of the radial ring-shaped thread structure is polyvinylidene chloride, polypropylene or vinylon.

According to this embodiment, the material of the radial ring-shaped thread structure is polyvinylidene chloride, polypropylene or vinylon. Due to its chemical resistance, not only the structure is not worn out, but can be semipermanently and easily secured at a low cost. Furthermore, the structure is also easily installed due to its light weight.

In one embodiment of the present invention, a coagulating sedimentation device having a sedimentation section is included; and
the attachment filter is installed in the subsequent stage of the coagulating sedimentation device.

According to this embodiment, a coagulating sedimentation device having a sedimentation section is included; and
the attachment filter is installed in the subsequent stage of the coagulating sedimentation device.
A fine pin floc originating in a coagulant after coagulating sedimentation can be treated by these attachment filter and rapid filter without consuming a large amount of electrical energy.

In one embodiment of the present invention, the coagulating sedimentation device is included; and
the attachment filter having a sedimentation section and the rapid filter are installed in the subsequent stage of the coagulating sedimentation device.

According to this embodiment, the attachment filter having a sedimentation section and the rapid filter are installed in the subsequent stage of the coagulating sedimentation device. Therefore, a fine pin floc originating in a coagulant after coagulating sedimentation can be treated by these attachment filter and rapid filter without consuming a large amount of electrical energy. At the same time, genesis sludge capacity is small as compared to a case where the rapid filter is solely installed.

In one embodiment of the present invention, a biological treatment device is included; and
the attachment filter having a sedimentation section is installed in the subsequent stage of the biological treatment device.

According to this embodiment, the attachment filter having a sedimentation section is installed in the subsequent stage of the biological treatment device. Therefore, a fine pin floc originating in a coagulant after coagulating sedimentation can be treated by this attachment filter without consuming a large amount of electrical energy.

In one embodiment of the present invention, a biological treatment device is included; and
the attachment filter and the rapid filter are installed in the subsequent stage of the biological treatment device.

According to this embodiment, the attachment filter and the rapid filter are installed in the subsequent stage of the biological treatment device. Therefore, a fine pin floc originating in microorganisms after biological treatment can be reliably and precisely treated by using the attachment filter and the rapid filter. At the same time, genesis sludge capacity is small as compared to a case where the rapid filter is solely installed.

In one embodiment of the present invention, a neutralization device is included; and the attachment filter is installed in the subsequent stage of the neutralization device.

According to this embodiment, the attachment filter is installed in the subsequent stage of the neutralization device. Therefore, a fine pin floc generating in neutral products after neutralization can be treated by using these attachment filter and rapid filter without consuming a large amount of electrical energy.

In one embodiment of the present invention, a neutralization device is included; and the attachment filter having a sedimentation section and the rapid filter are installed in the subsequent stage of the neutralization device.

According to this embodiment, the attachment filter having a sedimentation section and the rapid filter are installed in the subsequent stage of the neutralization device. Therefore, a fine pin floc generating in neutral products after neutralization can be treated by using these attachment filter and rapid filter without consuming a large amount of electrical energy. At the same time, genesis sludge capacity is small as compared to a case where the rapid filter is solely installed.

In one embodiment of the present invention, activated carbon is attached to the packing material composed of the radial ring-shaped thread structures.

According to this embodiment, activated carbon is attached to the packing material composed of the radial ring-shaped thread structures. Therefore, a surfactant in waste water is first adsorbed to activated carbon and then the surfactant can be adsorbed by microorganisms propagated on the activated carbon and the radial ring-shaped body.

The activated carbon exert a decolorizing function and a function for adsorbing organic matters, which are original functions of activated carbon. As a result, two functions, that is, an organic matter treating function of microorganisms propagated on the radial ring-shaped thread structure, which is a packing material, and a physical adsorbing function of activated carbon, can be exerted.

In one embodiment of the present invention, the attachment filter has either air washing equipment or water jet washing equipment or both of them for washing the packing material; and the packing material is backwashed by air or water jet or both of them.

In this embodiment, backwash of the attachment filter having a sedimentation section can be performed by air, water jet or both of them. Therefore, when a large amount of sludge is generated, the generated sludge can be removed by backwash and then sedimented and removed from the sedimentation section.

In one embodiment of the present invention, waste water to be treated contains a surfactant.

According to this embodiment, waste water to be treated contains a surfactant. Therefore, the dissolved surfactant can be efficiently treated with the radial ring-shaped body wherein activated carbon is widely attached and distributed.

In one embodiment of the present invention, solids suspended in waste water are attached to a packing material and the solids attached to the packing material are sedimented to treat the waste water.

In this embodiment, solids suspended in the waste water are attached to the packing material and the particle sizes are increased. Then, the solids are further digested and reduced. The solids attached to the packing material are sedimented, separated and removed. Therefore, solids suspended in waste water can be filtered without consuming a large amount of electrical energy and the amount of waste can be reduced. Furthermore, the generated sludge is sedimented in the sedimentation section and removed from the sedimentation section. Thus, waste water can be treated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5A is a timing chart in a case where the suspended solid concentration is normal in the waste-water treatment system of the fourth embodiment and FIG. 5B is a timing chart in a case where the suspended solid concentration is low;

DETAILED DESCRIPTION OF THE PREFERRED EMBODIMENTS

Hereafter, embodiments of the present invention are described in detail with reference to the accompanying drawings.

(First Embodiment)

Figure 1:
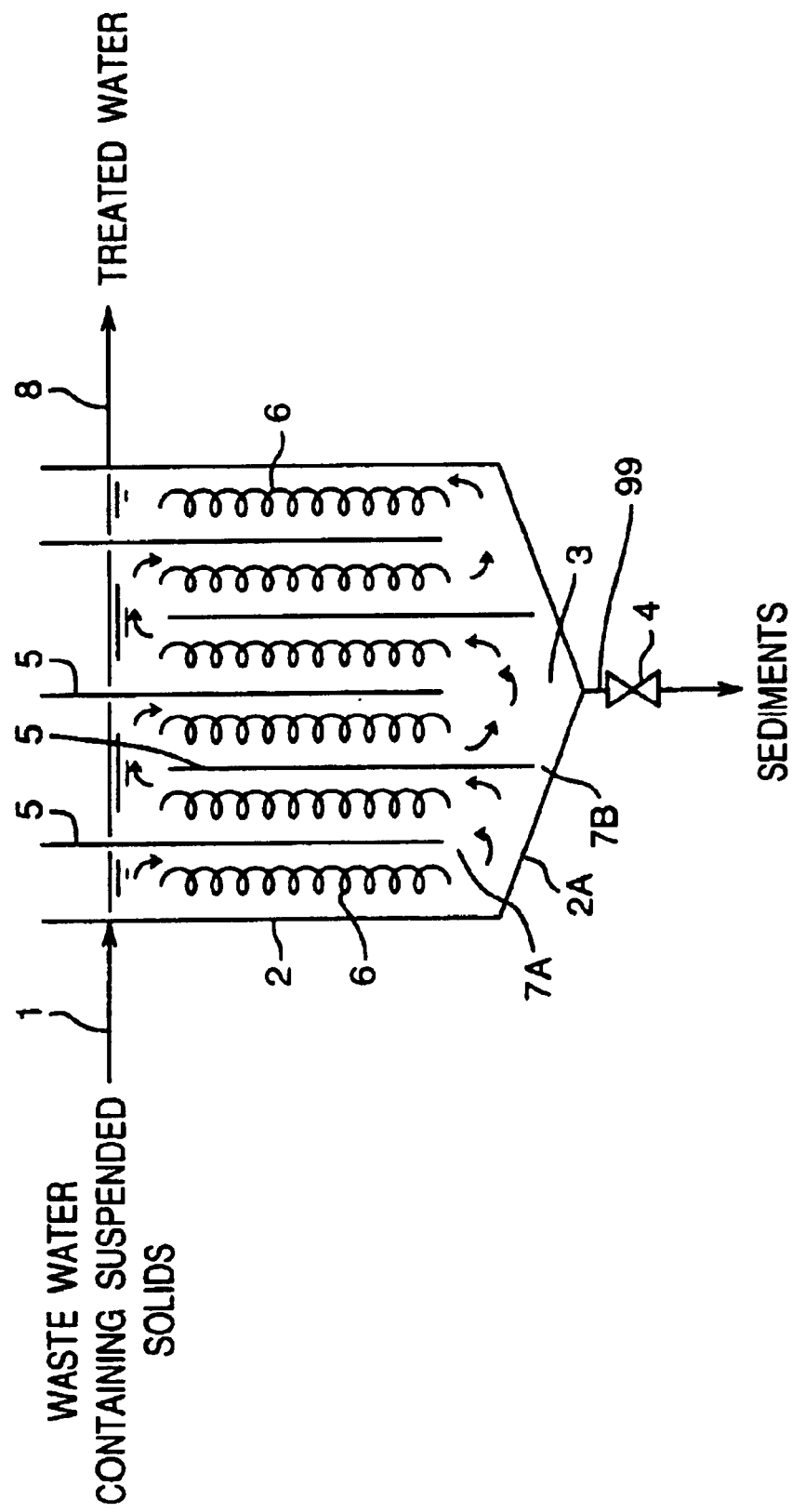
FIG. 1 is a block diagram showing a waste-water treatment system according to a first embodiment of the invention.

FIG. 1 shows a constitution of a waste-water treatment system according to a first embodiment of the invention. The first embodiment has a substantially cylindrical attachment filter tank 2. The attachment filter tank 2 has a mortar-like sedimentation section 3 in its lower portion 2A. The waste water containing suspended solids flows from an inflow pipe 1 into the attachment filter tank 2 having a sedimentation section 3.

The sedimentation section 3 of the attachment filter tank 2 is constituted by the mortar-like lower portion 2A. Sediments deposited in this sedimentation section 3 are allowed to flow out from an drain pipe 99 connected to a valve 4 by opening the valve 4.

Partition plates 5 and radial ring-shaped thread structures 6 are installed in the attachment filter tank 2. A plurality of the partition plates 5 are arranged at predetermined gaps in a horizontal direction while vertically positioned alternately at a position distant from the lower portion 2A and a position adjacent thereto. The partition plates 5 positioned distant from the lower portion 2A have a wide path 7A formed between them and lower portion 2A. The partition plates 5 positioned adjacent to the lower portion 2A have a narrow path 7B between them and the lower portion 2A.

Figure 16B:
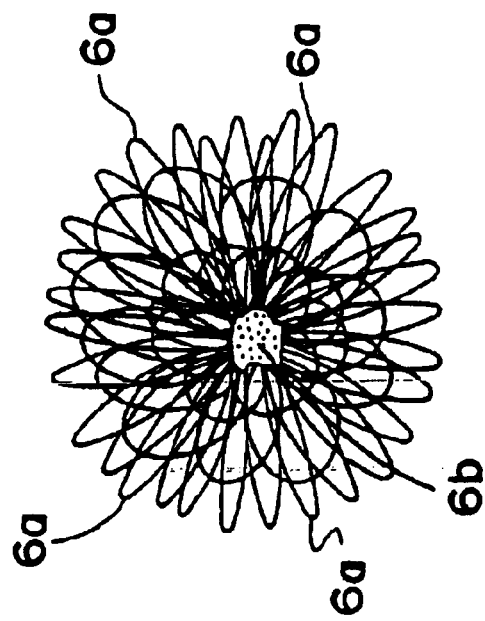
FIG. 16A is a side view showing a radial ring-shaped thread structure 6 installed in the above embodiments viewed from its side and FIG. 16B is a front view showing the radial ring-shaped thread structure 6.
Figure 16A:
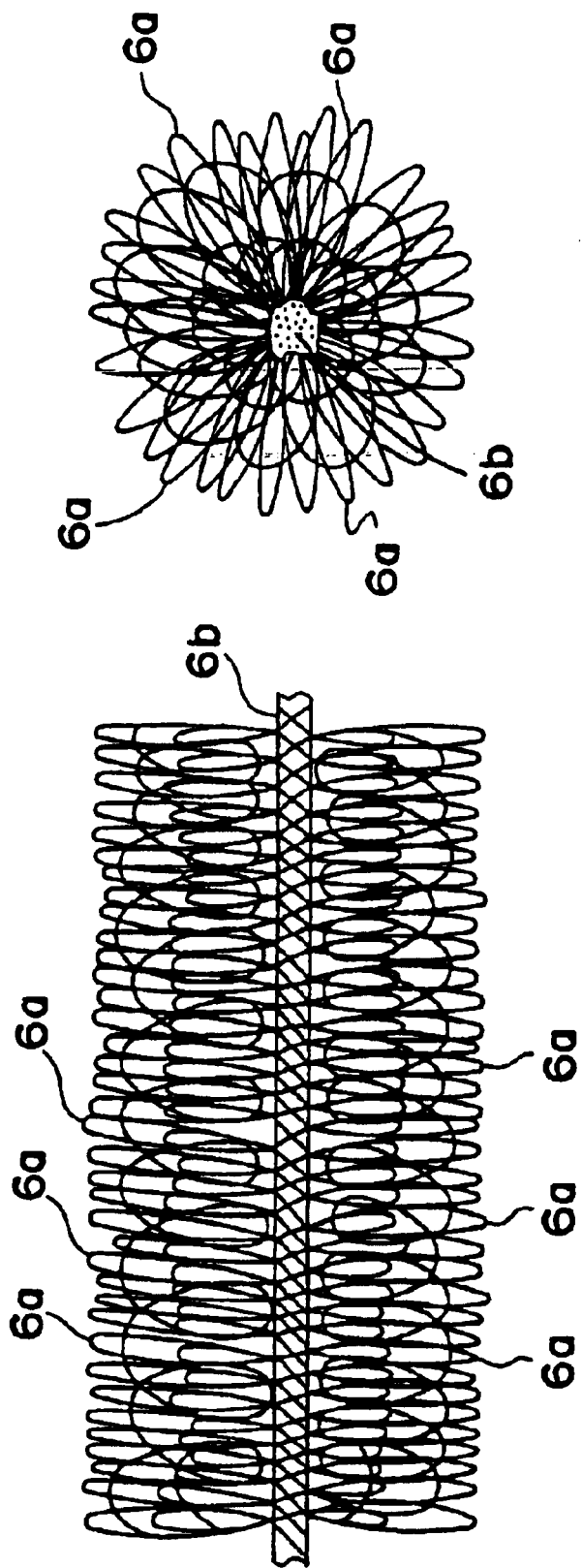

A radial ring-shaped thread structure 6 is disposed in each space partitioned by the partition plates 5. The radial ring-shaped thread structure 6 has a plurality of ring-shaped sections 6a extending from a thread body 6b in its center as shown in FIGS. 16A and 16B.

The waste water containing suspended solids flows from the inflow pipe 1 into the attachment filter tank 2 having a sedimentation section 3. As shown in the figure, the waste water moves downwards from top in a space partitioned by the partition plates 5, passes through the wide path 7A and moves upwards from the bottom in a neighboring space. Furthermore, the waste water moves upwards from the bottom in the above space. Thus, the waste water is spread throughout the tank 2 without making a short path in each space and flows out from an outflow pipe 8.

Since the radial ring-shaped thread structure 6 installed in each space partitioned by the partition plates 5 is negatively charged, solids suspended in the waste water are attached to the radial ring-shaped thread structure 6. Since the central part of the radial ring-shaped thread structure 6 has a mesh-like structure and oxygen is hardly spread, anaerobic microorganisms are propagated and solids attached to the radial ring-shaped thread structure 6 are anaerobically digested with a time lapse. The "digestion" here means that anaerobic microorganisms are reacted with organic matters so that the organic matters are decomposed and sludge (solids) is digested and reduced. Organic matters (sludge) containing suspended solids have a small specific gravity, but the specific gravity is increased by this digestion.

The anaerobically digested suspended solids are digested and reduced with a time lapse, descend to the lower portion 2A of the attachment filter tank 2, flow along the lower portion 2A through the narrow path 7B and reach the sedimentation section 3, where they are sedimented. Then, the suspended solids, that is, sludge, which are digested and reduced, are sedimented in the sedimentation section 3 of the attachment filter tank 2 and discharged from the attachment filter tank 2 by opening the valve 4 provided in the drain pipe 99.

The residence time of the waste water containing suspended solids in the attachment filter tank 2 is preferably, but not limited to, 2 hours or longer.

According to the first embodiment, waste water is caused to flow through the radial ring-shaped thread structure 6, which is a packing material having an attaching function and installed in the attachment filter tank 2 so that solids suspended in the waste water are attached to the radial ring-shaped thread structure 6 and filtered. Therefore, electrical energy is not consumed. Furthermore, solids suspended in the waste water are attached to the radial ring-shaped thread structure 6 and then their particle sizes are increased and the total amount is reduced by digestion, resulting in reduction of waste.

The solids attached to the radial ring-shaped thread structure 6, which is a packing material, are enlarged with a time lapse because their particle sizes are increased, and then digested by anaerobic microorganisms with a time lapse. The solids, which become easily sedimentable, are exfoliated and sedimented in the sedimentation section 3.

Therefore, the first embodiment is a filter of markedly energy saving type as compared with a rapid filter as a physical filter using a pump or the like and can also reduce the total amount of the suspended solids.

(Second Embodiment)

Figure 2:
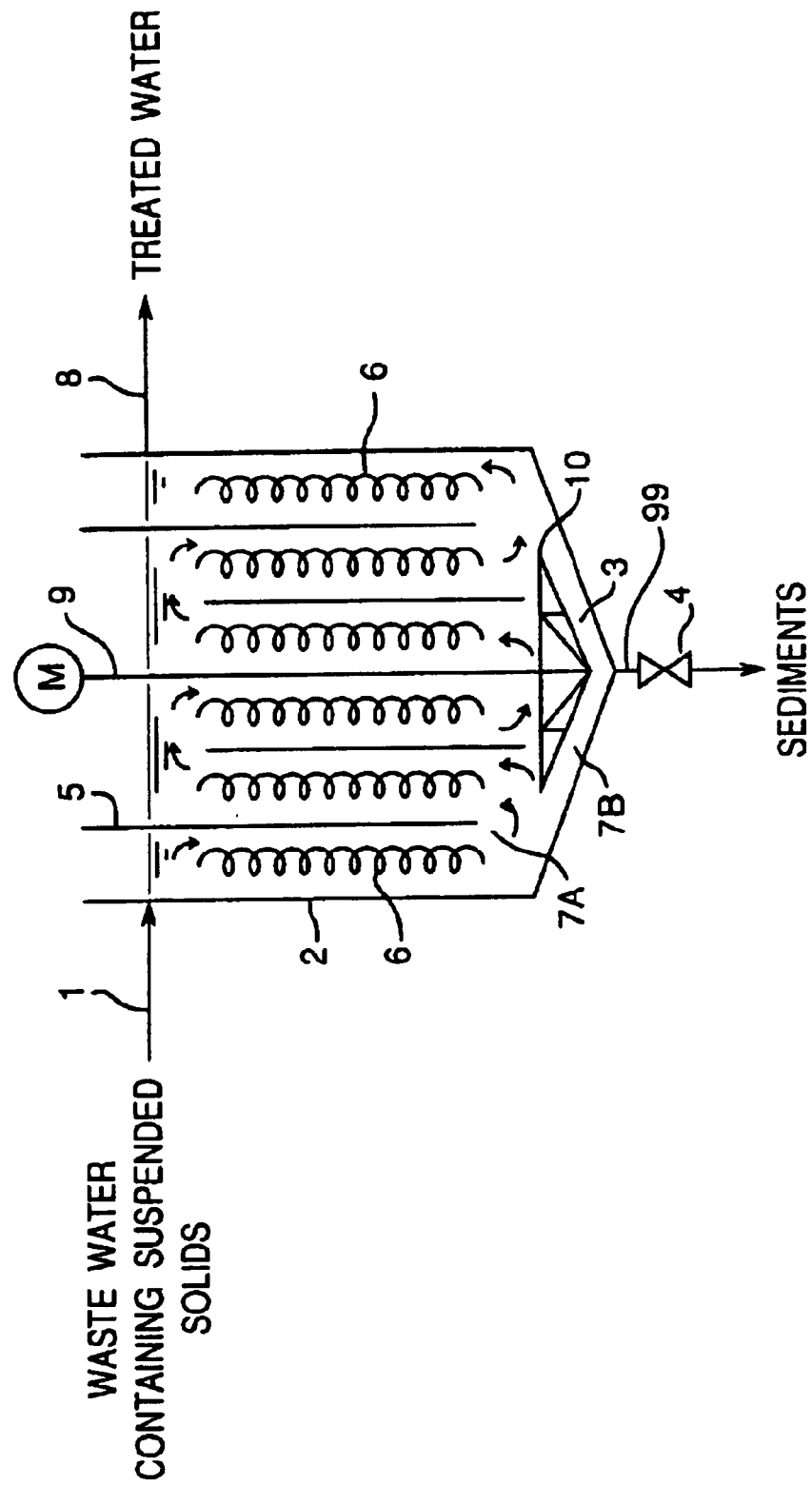
FIG. 2 is a block diagram showing a waste-water treatment system according to a second embodiment of the invention.

FIG. 2 shows a waste-water treatment system according to a second embodiment of the invention. The second embodiment is the same as the above-described first embodiment except that a gathering device 9 is installed in the attachment filter tank 2.

The gathering device 9 has a rake 10 disposed in the sedimentation section 3. The rake 10 has a function for collecting sludge sedimented in the sedimentation section 3. This gathering device 9 is particularly effective when a large amount of solids are suspended in waste water and there is a large amount sludge originating from digested solids in the lower portion of the attachment filter tank 2. That is, the gathering device 9 is driven by a motor to rotate the rake 10 so that sludge accumulated in the sedimentation section 3 is collected. Consequently, a large amount of sedimented sludge can be efficiently discharged from the drain pipe 99 via the valve 4.

(Third Embodiment)

Figure 3:
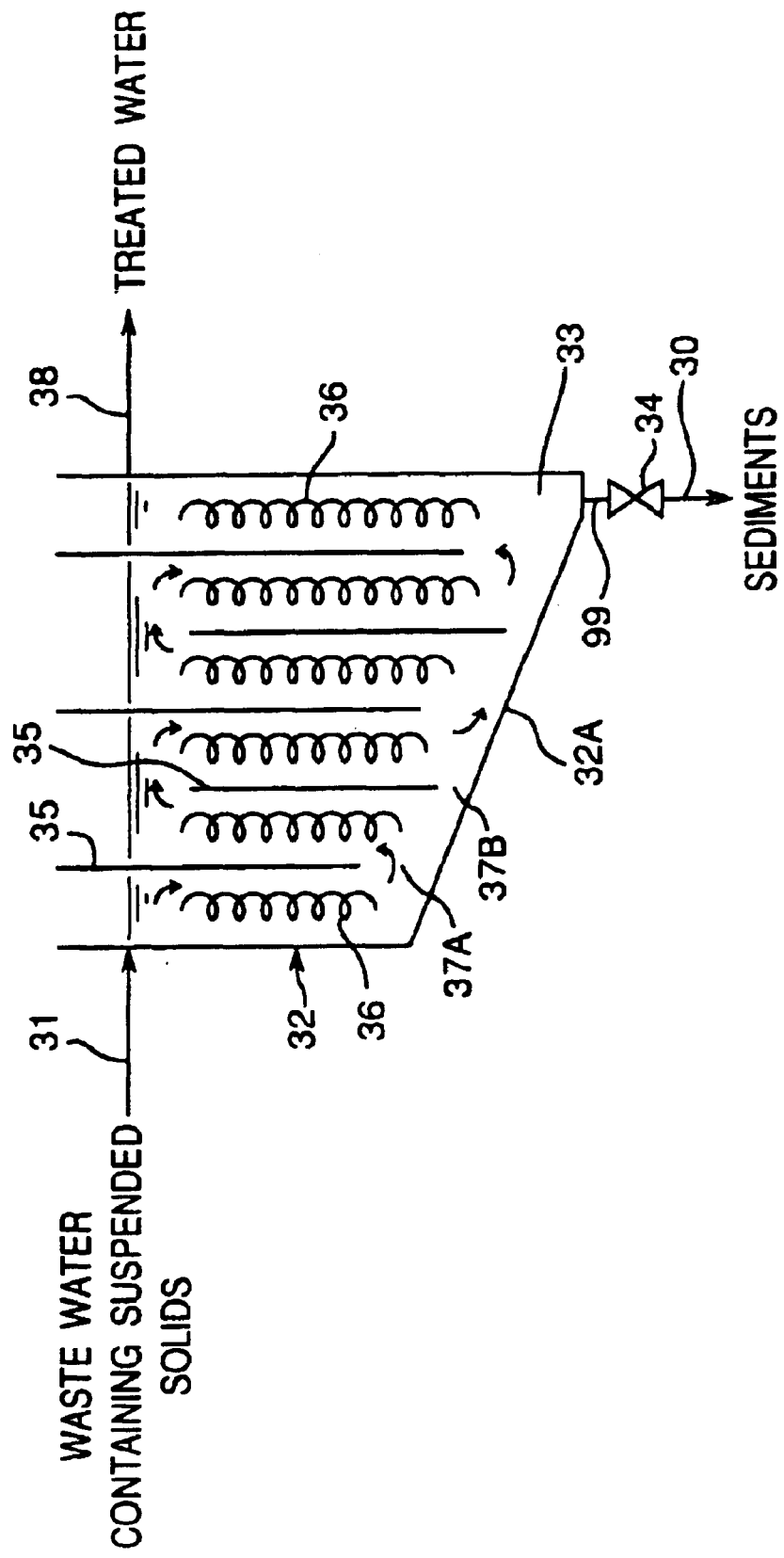
FIG. 3 is a block diagram showing a waste-water treatment system according to a third embodiment of the invention.

FIG. 3 shows a waste-water treatment system according to a third embodiment of the invention. The third embodiment has an angular-type attachment filter tank 32, which has a trapezoidal section with a shorter edge on the inflow pipe 31 side and a longer edge on the outflow pipe 38 side unlike the above-mentioned first embodiment. This attachment filter tank 32 has a bottom section 32A, which is an oblique edge declining from the inflow pipe 31 side towards the outflow pipe 38 side. A sedimentation section 33 is formed at a lower end of the bottom section 32A. A sludge drain pipe 30 having a valve 34 is connected to the sedimentation section 33.

Furthermore, a plurality of partition plates 35 are disposed at predetermined gaps in the lateral direction from the inflow side towards the outflow side while vertically positioned along the inclined bottom section 32A alternately at a position distant from the bottom section 32A and a position adjacent thereto. The partition plates 35 at the distant positions have a wide path 37A formed between them and the bottom section 32A. The partition plates 35 at the adjacent positions have a narrow path 37B formed between them and the bottom section 32A. Furthermore, a radial ring-shaped thread structure 36 is disposed in each space partitioned by the plurality of partition plates 5 as in the first embodiment.

Since the waste-water treatment system of the third embodiment has the rectangular-type attachment filter tank 32 having a trapezoidal section, its overall outer shape is different from that of the first embodiment having a cylindrical attachment filter tank 2. Therefore, this system can be space-efficiently installed in a square-shaped installation site.

(Fourth Embodiment)

Figure 4:
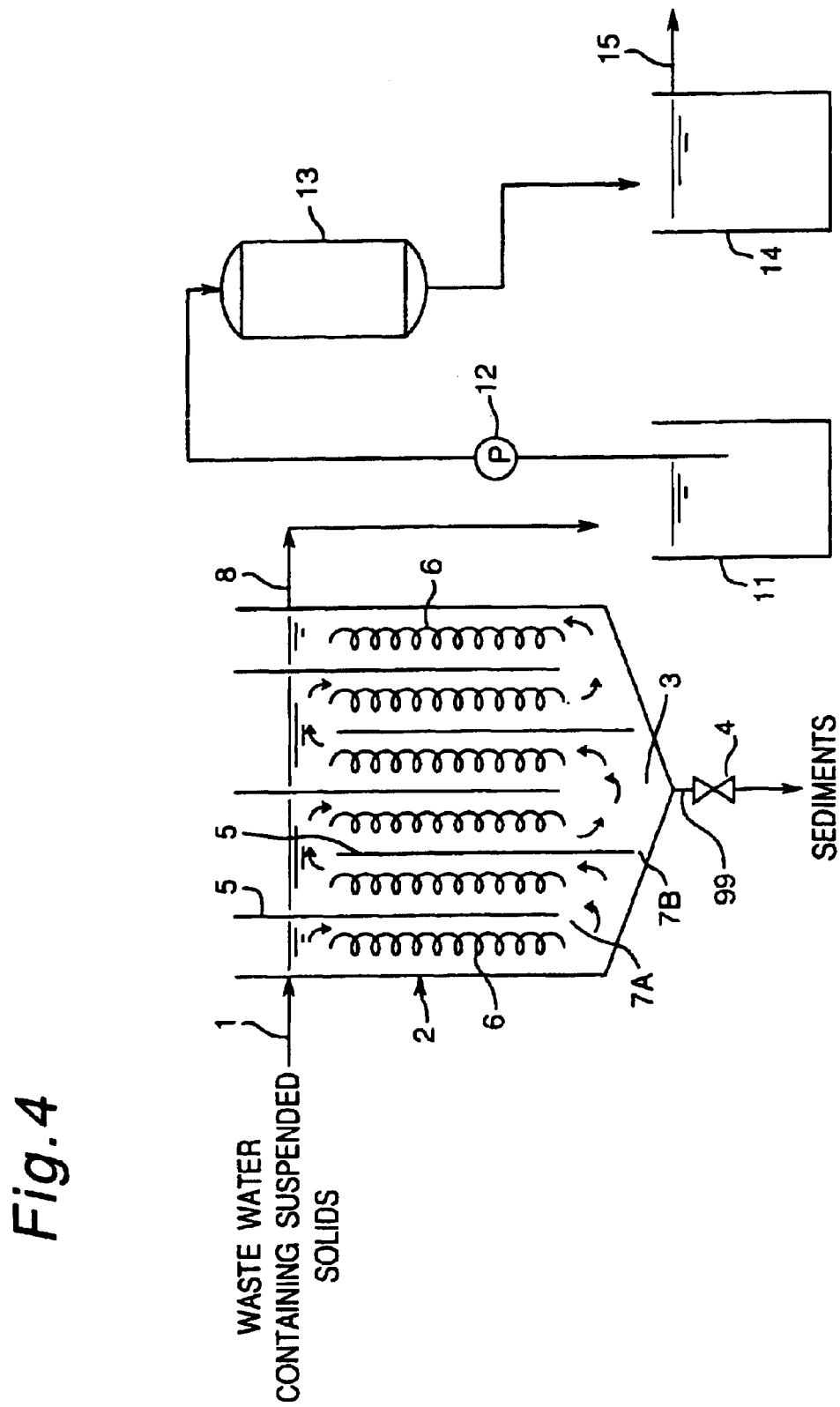
FIG. 4 is a block diagram showing a waste-water treatment system according to a fourth embodiment of the invention.

FIG. 4 shows a waste-water treatment system according to a fourth embodiment of the invention. In this embodiment, a pit 11, which is a small-size water tank, a rapid filter 13 as a physical filter using a pit pump or the like and a pit 14 are successively installed on the subsequent stage of the attachment filter tank 2 of the first embodiment. An outflow pipe 15 is connected to the pit 14. The rapid filter 13 is a physical filter that uses a pump or the like and filters water to be treated by forcibly causing the water to flow through a filtering medium.

In the fourth embodiment, solids suspended in waste water are first sedimented and filtered in the attachment filter tank 2 and then treated in the rapid filter 13. Therefore, solids suspended in the waste water are treated more reliably than in the first embodiment. However, since the pit pump 12 is used, electricity as energy is required.

FIG. 5A shows an example of a timing chart when the suspended solid concentration in the waste water is normal in this embodiment. FIG. 5B shows an example of a timing chart when the suspended solid concentration in the waste water is low. As is evident when FIGS. 5A and 5B are compared, the residence time in the attachment filter tank 2 is 2 hours at a normal concentration, whereas it is 1 hour at a low concentration. It is noted that the residence times in the pits 11, 15 and the rapid filter 13 are all 0.5 hour both at a normal concentration and a low concentration.

(Fifth Embodiment)

Figure 6:
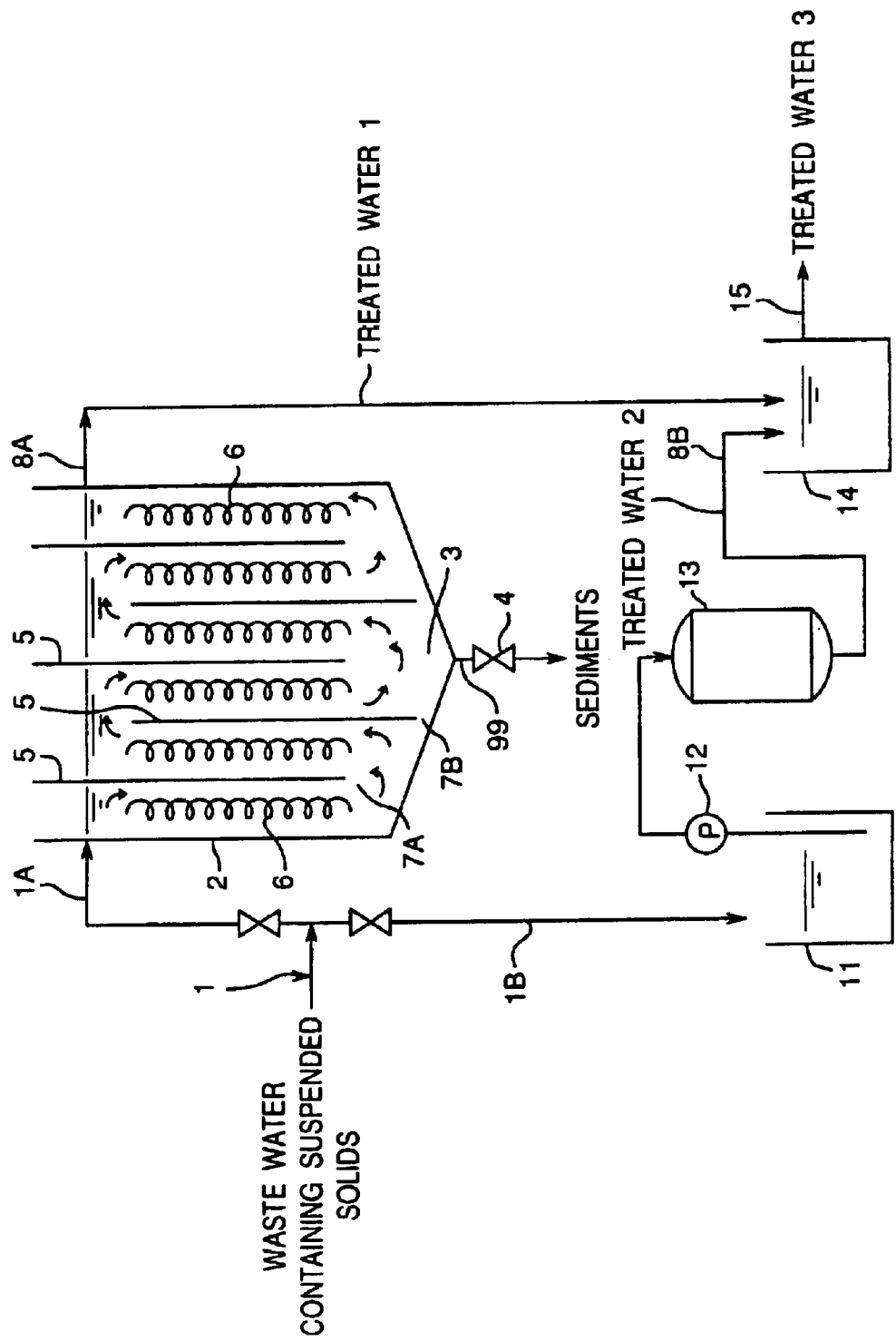
FIG. 6 is a block diagram showing a waste-water treatment system according to a fifth embodiment of the invention.

FIG. 6 shows a waste-water treatment system according to a fifth embodiment of the invention. In the fifth embodiment, a branch inflow pipe 1A and a branch inflow pipe 1B are branched from the inflow pipe 1. The branch inflow pipe 1A is connected to the attachment filter tank 2 of the first embodiment. The outflow pipe 8A for treated water 1 from the attachment filter tank 2 is merged with the pit 14.

Meanwhile, the branch inflow pipe 1B is connected to the rapid filter 13 via the pit 11 and the pit pump 12. The outflow pipe 8B for treated water 2 from the rapid filter 13 is merged with the pit 14.

That is, the fifth embodiment is constituted such that waste water containing suspended solids that flows from the inflow pipe 1 is simultaneously treated in the attachment filter tank 2 and the rapid filter 13 in parallel. The waste water in this attachment filter tank 2 is treated in the same manner as described in the first embodiment. In the fifth embodiment, waste water treated in the attachment filter tank 2 and the rapid filter 13 in parallel is mixed in the pit 14 and allowed to flow out from the outflow pipe 15.

In the fifth embodiment, since waste water containing suspended solids is distributed into the attachment filter tank 2 and the rapid filter 13 and treated in parallel, power consumption can be reduced as compared with the fourth embodiment, wherein all the waste water containing suspended solids is treated in the attachment filter tank 2 and then in the rapid filter tank 13. The reason is that a large amount of electricity is consumed by the rapid filter 13 system.

(Sixth Embodiment)

Figure 7:
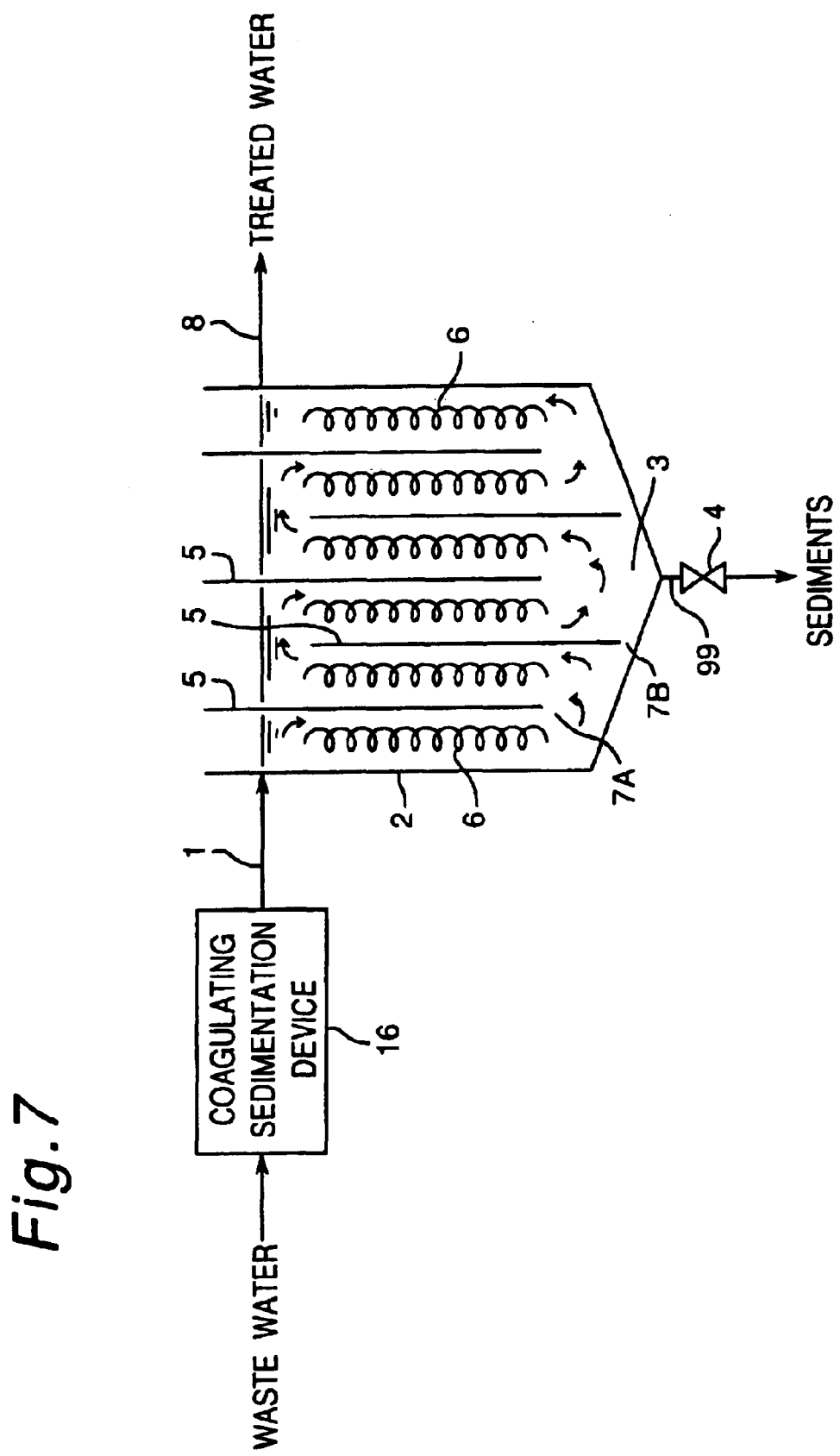
FIG. 7 is a block diagram showing a waste-water treatment system according to a sixth embodiment of the invention.

FIG. 7 shows a waste-water treatment system according to a sixth embodiment of the invention. The sixth embodiment is the same as the first embodiment except that a coagulating sedimentation device 16 is installed in the previous stage of the attachment filter tank 2.

In the sixth embodiment, treated water from the coagulating sedimentation device 16 can be further subjected to an advanced treatment in the attachment filter tank 2. Furthermore, after the coagulating sedimentation in the coagulating sedimentation device 16, a fine pin floc originating from a coagulant can be treated in the attachment filter tank 2. According to the sixth embodiment, power consumption is less than in a conventional device, wherein treated water from the coagulating sedimentation device 16 is treated in the rapid filter, which consumes a large amount of electricity. Thus, an energy saving waste-water treatment system is provided.

(Seventh Embodiment)

Figure 8:
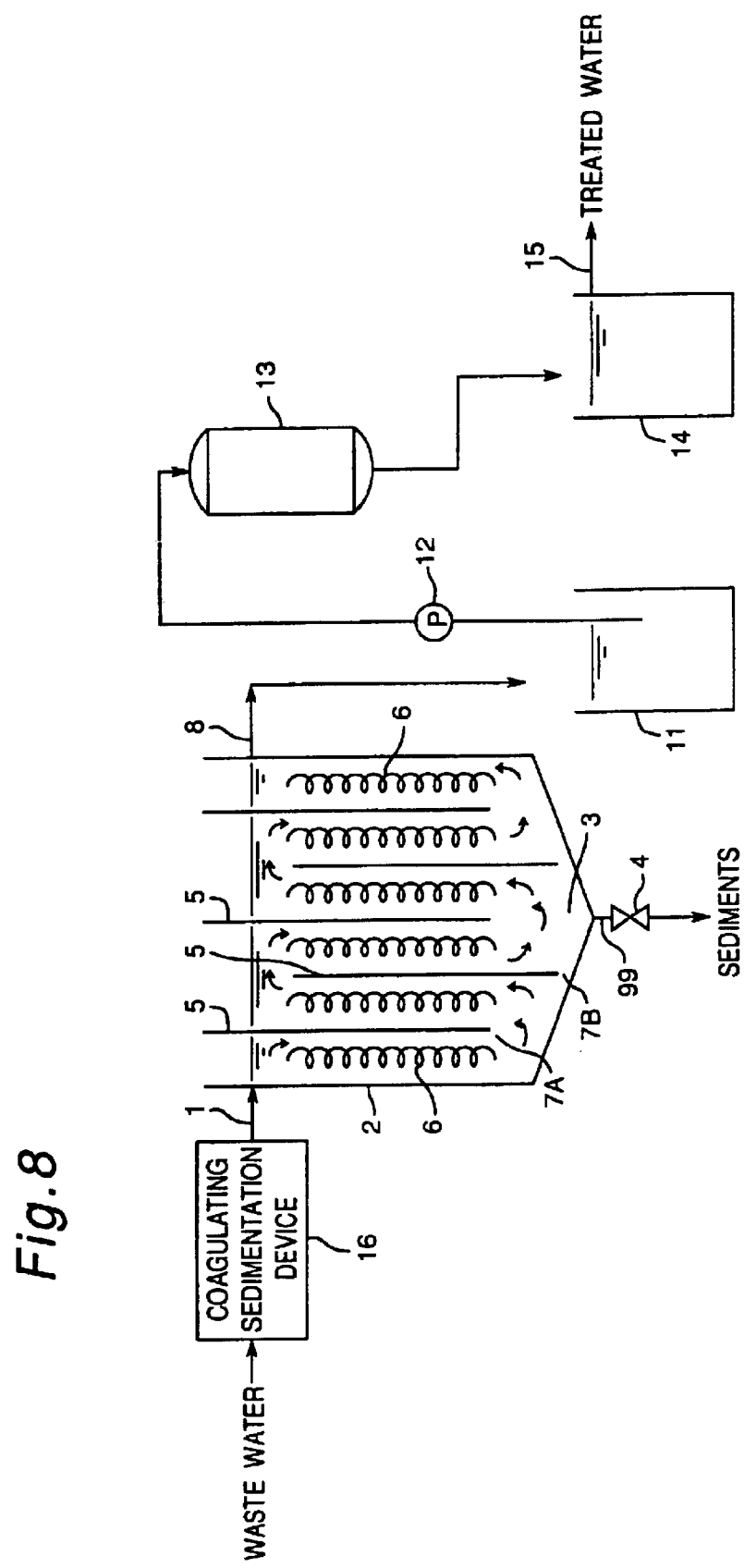
FIG. 8 is a block diagram showing a waste-water treatment system according to a seventh embodiment of the invention.

FIG. 8 shows a waste-water treatment system according to a seventh embodiment of the invention. In the seventh embodiment, a coagulating sedimentation device 16 is installed in the previous stage of the attachment filter tank 2 in the fourth embodiment, wherein a rapid filter 13 is installed in the subsequent stage of the attachment filter tank 2.

In the seventh embodiment, since treated water from the coagulating sedimentation device 16, wherein suspended solids contained in the inflow waste water are coagulated with a coagulant and sedimented, is treated in two stages, in the attachment filter tank 2 and the rapid filter 13 in the subsequent stage, suspended solids in the waste water can be treated more reliably. That is, a fine pin floc originating in the coagulant after the coagulating sedimentation can be reliably and precisely treated in the attachment filter tank 2 and the rapid filter 13.

(Eighth Embodiment)

Figure 9:
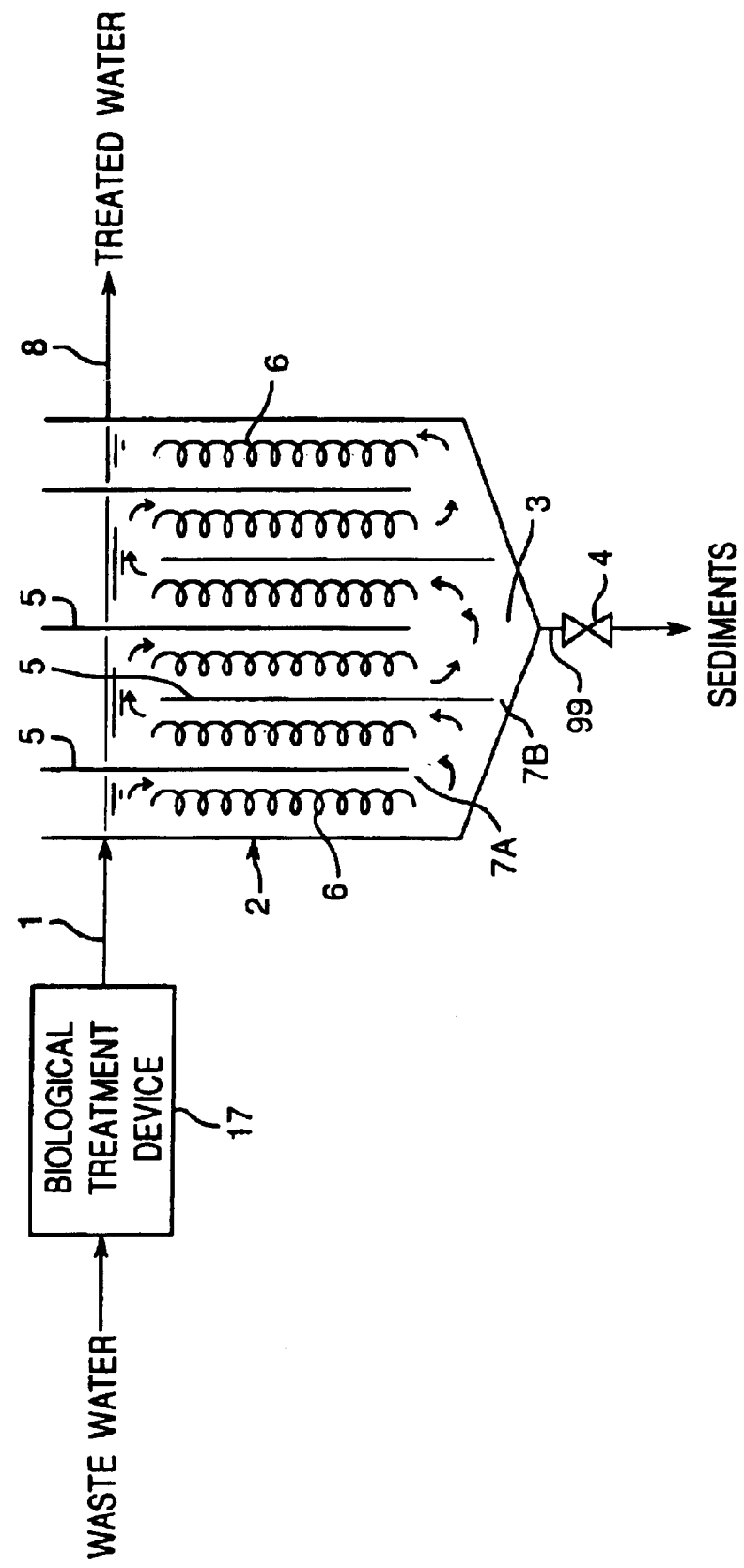
FIG. 9 is a block diagram showing a waste-water treatment system according to an eighth embodiment of the invention.

FIG. 9 shows a waste-water treatment system according to an eighth embodiment of the invention. The eighth embodiment is the same as the first embodiment except that a biological treatment device 17, wherein inflow wastewater is treated by using microorganisms, is disposed in the previous stage of the attachment filter tank 2 having a sedimentation section 3. Therefore, in the eighth embodiment, the same component members as in the first embodiment are designated by the same reference numerals and a detail explanation thereof is omitted.

In the eighth embodiment, treated water containing a relatively large amount of suspended solids from the biological treatment device 17 is further subjected to an advanced treatment in the attachment filter tank 2. That is, a fine pin floc originating from microorganisms after the biological treatment can be treated by this attachment filter tank 2 without consuming a large amount of electrical energy. According to the eighth embodiment, power consumption is less than in a conventional device, wherein treated water from the biological treatment device 17 is treated in the rapid filter 13, which consumes a large amount of electricity. Thus, an energy saving waste-water treatment system is provided.

(Ninth Embodiment)

Figure 10:
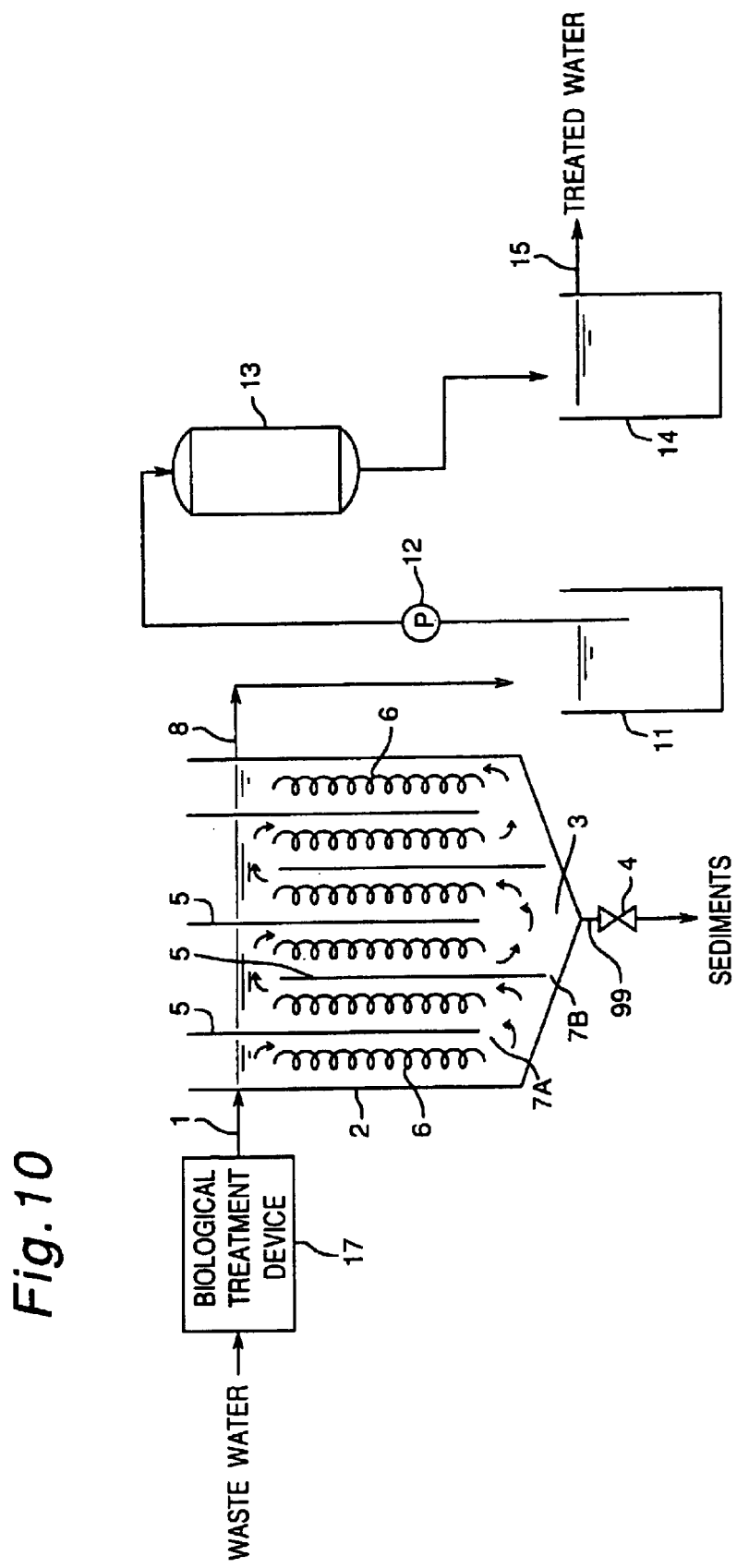
FIG. 10 is a block diagram showing a waste-water treatment system according to a ninth embodiment of the invention.

FIG. 10 shows a waste-water treatment system according to a ninth embodiment of the invention. The ninth embodiment is the same as the seventh embodiment except that a biological treatment device 17 is disposed before the attachment filter tank 2 having a sedimentation section 3. Therefore, in the ninth embodiment, the same component members as in the seventh embodiment are designated by the same reference numerals and a detail explanation thereof is omitted.

In the ninth embodiment, treated water containing a relatively large amount of suspended solids from the biological treatment device 17 is further subjected to an advanced treatment in the attachment filter tank 2 and the rapid filter 13. In the ninth embodiment, treated water from the biological treatment device 17 is treated in two stages, in the attachment filter tank 2 and the rapid filter 13, solids suspended in the waste water can be treated more reliably.

(Tenth Embodiment)

Figure 11:
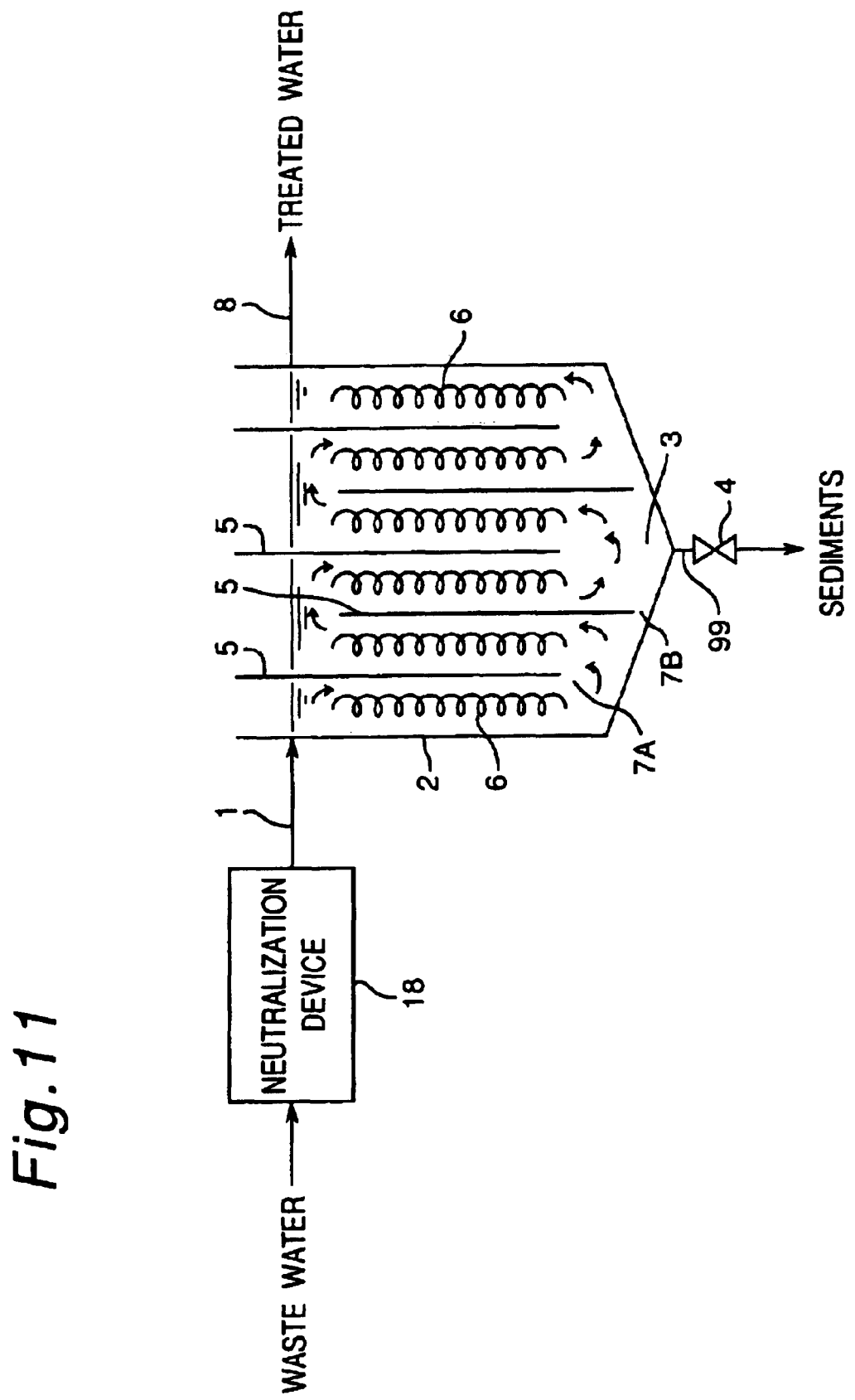
FIG. 11 is a block diagram showing a waste-water treatment system according to a tenth embodiment of the invention.

FIG. 11 shows a waste-water treatment system according to a tenth embodiment of the invention. The tenth embodiment is the same as the first embodiment except that a neutralization device 18 is disposed in the previous stage of the attachment filter tank 2 having a sedimentation section 3. Therefore, in the tenth embodiment, the same component members as in the first embodiment are designated by the same reference numerals and a detail explanation thereof is omitted.

In the tenth embodiment, treated water containing a relatively large amount of suspended solids, which is neutralized in the neutralization device 18, is further subjected to an advanced treatment in the attachment filter tank 2. According to the tenth embodiment, power consumption is less than in a conventional device, wherein treated water from the neutralization device 18 is treated in the rapid filter 13, which consumes a large amount of electricity. Thus, an energy saving waste-water treatment system is provided.

(Eleventh Embodiment)

Figure 12:
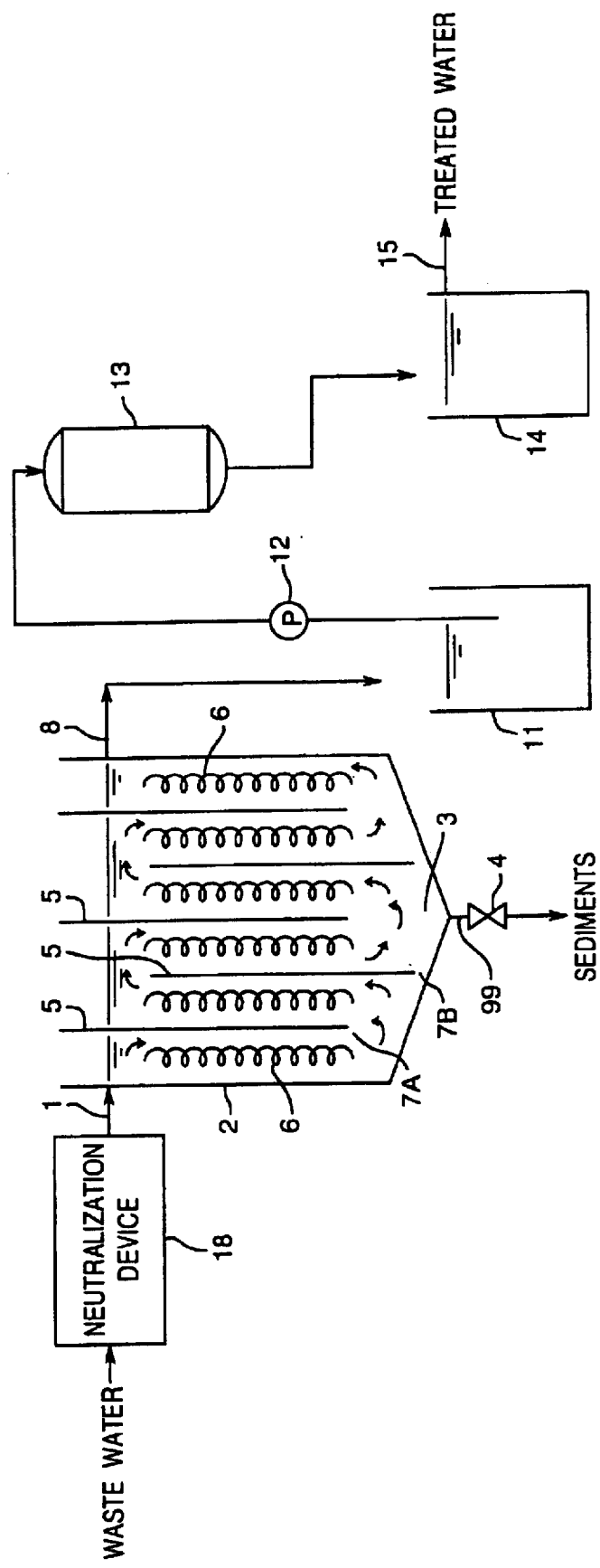
FIG. 12 is a block diagram showing a waste-water treatment system according to an eleventh embodiment of the invention.

FIG. 12 shows a waste-water treatment system according to an eleventh embodiment of the invention. The eleventh embodiment is the same as the seventh embodiment except that a neutralization device 18 is disposed in the previous stage of the attachment filter tank 2 having a sedimentation section 3. Therefore, in the eleventh embodiment, the same component members as in the seventh embodiment are designated by the same reference numerals and a detail explanation thereof is omitted.

In the eleventh embodiment, treated water containing a relatively large amount of suspended solid from the neutralization device 18 is further subjected to an advanced treatment in the attachment filter tank 2 and the rapid filter 13. According to the eleventh embodiment, treated water from the neutralization device 18 is treated in two stages, in the attachment filter tank 2 and the rapid filter 13, consequently suspended solids in the waste water can be treated more reliably.

(Twelfth Embodiment)

Figure 13:
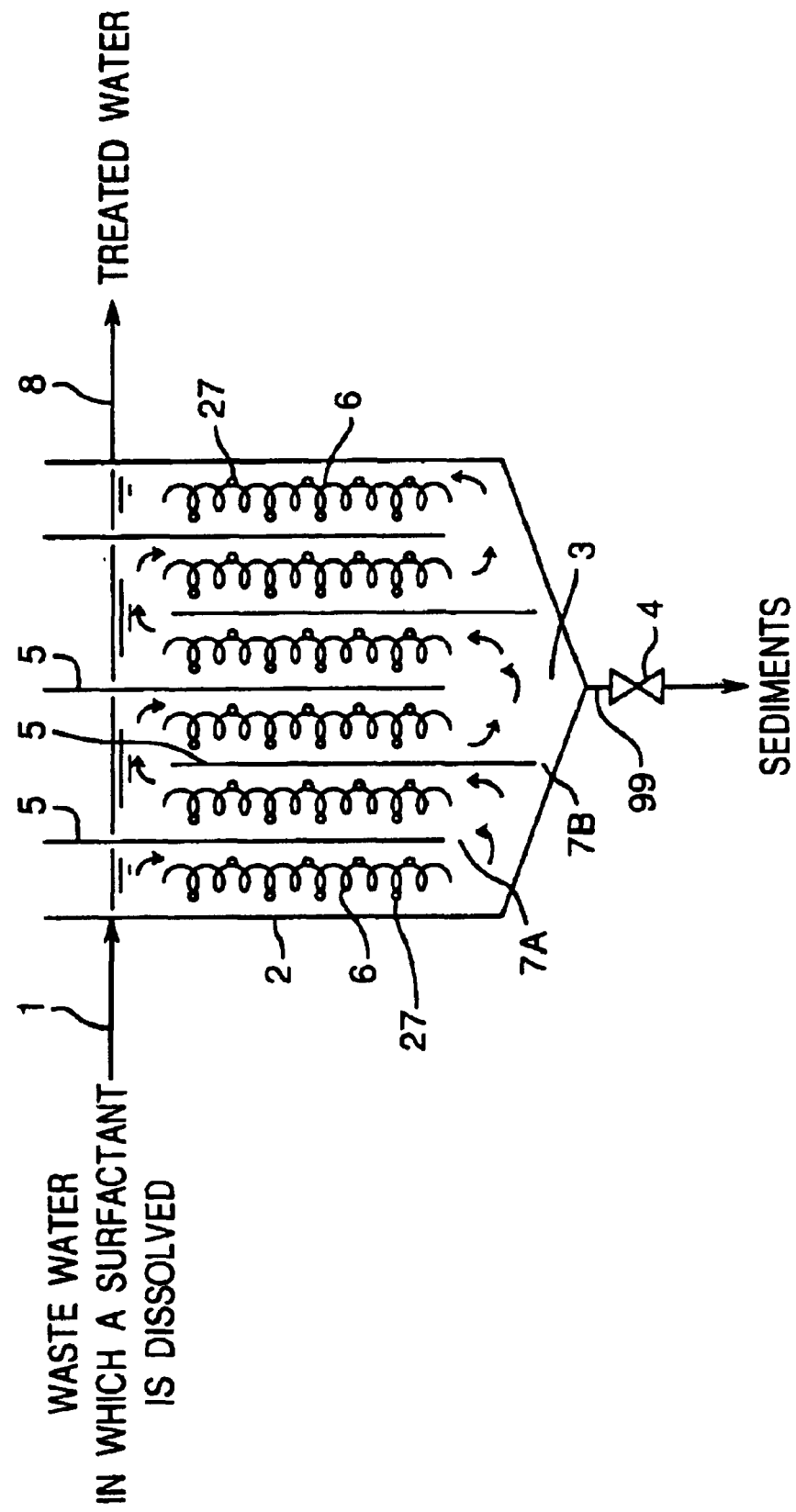
FIG. 13 is a block diagram showing a waste-water treatment system according to a twelfth embodiment of the invention.

FIG. 13 shows a waste-water treatment system according to a twelfth embodiment of the invention. In the twelfth embodiment, waste water in which a surfactant is dissolved is allowed to flow from the inflow pipe 1 into the attachment filter tank 2. In the first embodiment, the inflow waste water is waste water containing suspended solids. Furthermore, the twelfth embodiment is different from the first embodiment in that activated carbon 27 is attached to a radial ring-shaped thread structure 6 installed in the attachment filter tank 2 having a sedimentation section 3. Therefore, in the twelfth embodiment, the same component members as in the first embodiment are designated by the same reference numerals and a detail explanation thereof is omitted.

In the twelfth embodiment, first, waste water in which a surfactant is dissolved is allowed to flow into the attachment filter tank 2 having a sedimentation section 3. A radial ring-shaped thread structure 6 is installed in each space partitioned by partition plates 5 disposed in the attachment filter tank 2. Fine activated carbon 27 is attached to the surface of each radial ring-shaped thread structure 6 (in the same manner as attachment by static electricity). For example, since the radial ring-shaped thread structure 6 made of a material such as vinylidene chloride is negatively charged, activated carbon 27 in fine particles is easily attached to the radial ring-shaped thread structure 6 made of vinylidene chloride.

According to the twelfth embodiment, the surfactant dissolved in waste water can be adsorbed by fine activated carbon 27 attached on the surface of the radial ring-shaped thread structure 6. Then, the surfactant can be decomposed by microorganisms propagated on the activated carbon 27 and the radial ring-shaped thread body 6. That is, according to the twelfth embodiment, since the attachment filter tank 2 has the radial ring-shaped thread body 6 to which activated carbon 27 is attached, the system has a physical adsorbing function as well as a biological treatment function at the same time. Therefore, recalcitrant organic matters such as a surfactant or the like contained in waste water can also be adsorbed effectively and then biologically decomposed.

(Thirteenth Embodiment)

Figure 14:
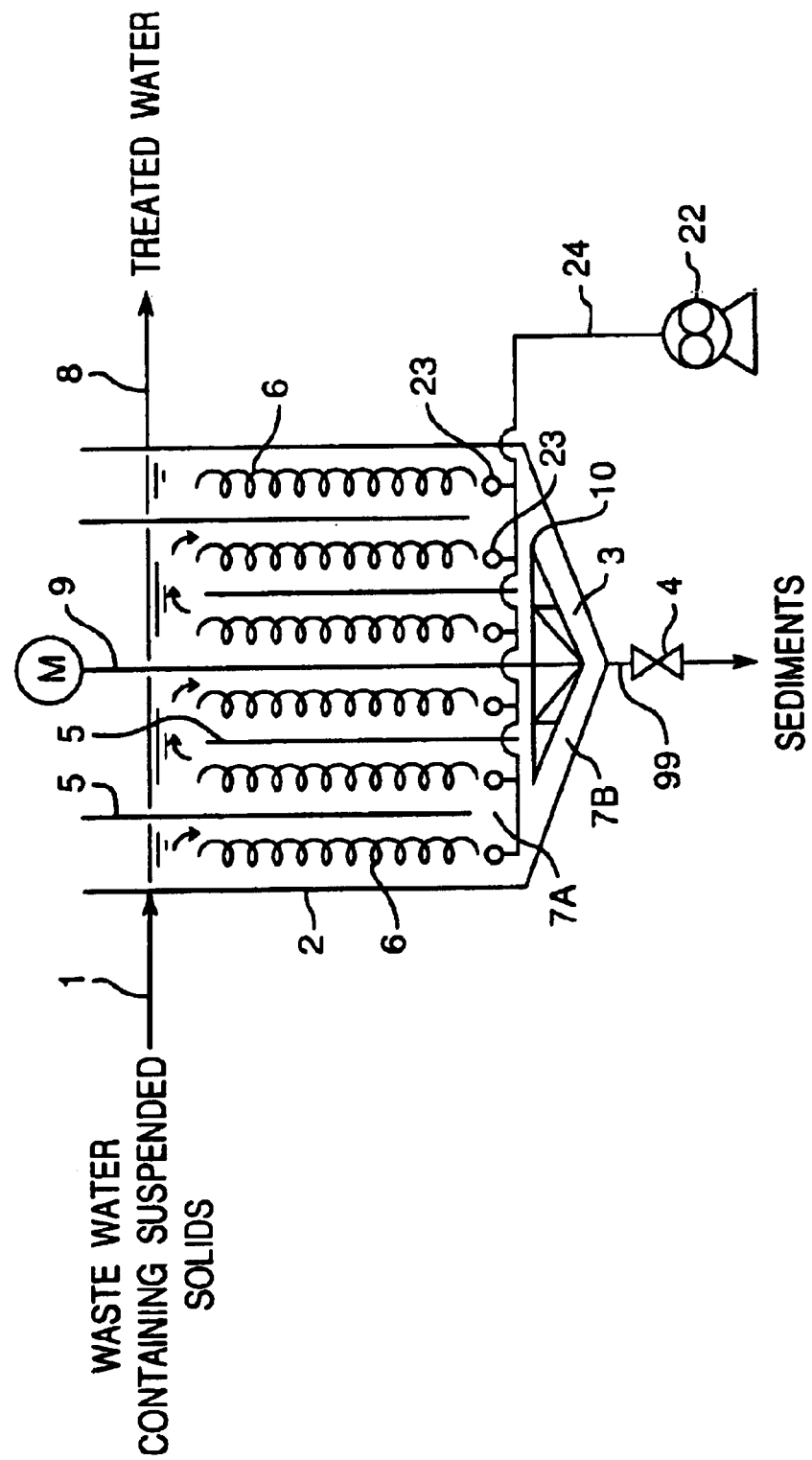
FIG. 14 is a block diagram showing a waste-water treatment system according to a thirteenth embodiment of the invention.

FIG. 14 shows a waste-water treatment system according to a thirteenth embodiment of the invention. The thirteenth embodiment is the same as the second embodiment except that a diffusing pipe 23 is disposed below each radial ring-shaped thread structure 6 in each space partitioned by partition plates 5 in the attachment filter tank 2. Therefore, in the thirteenth embodiment, the same component members as in the second embodiment are designated by the same reference numerals and a detail explanation thereof is omitted.

The diffusing pipe 23 is connected to a blower 22 with an air pipe 24. The diffusing pipe 23, the air pipe 24 and the blower 22 constitute air backwash equipment.

In the thirteenth embodiment, when solids attached to the radial ring-shaped body 6 are digested and then a large amount of suspended solids are attached to the radial ring-shaped thread structure 6, air is discharged from the diffusing pipe 23 of the air backwash equipment and the attached solids can be exfoliated and removed by air backwash. Then, the removed suspended solids can be sedimented and removed from the sedimentation section 3 through the drain pipe 99.

(Fourteenth Embodiment)

Figure 15:
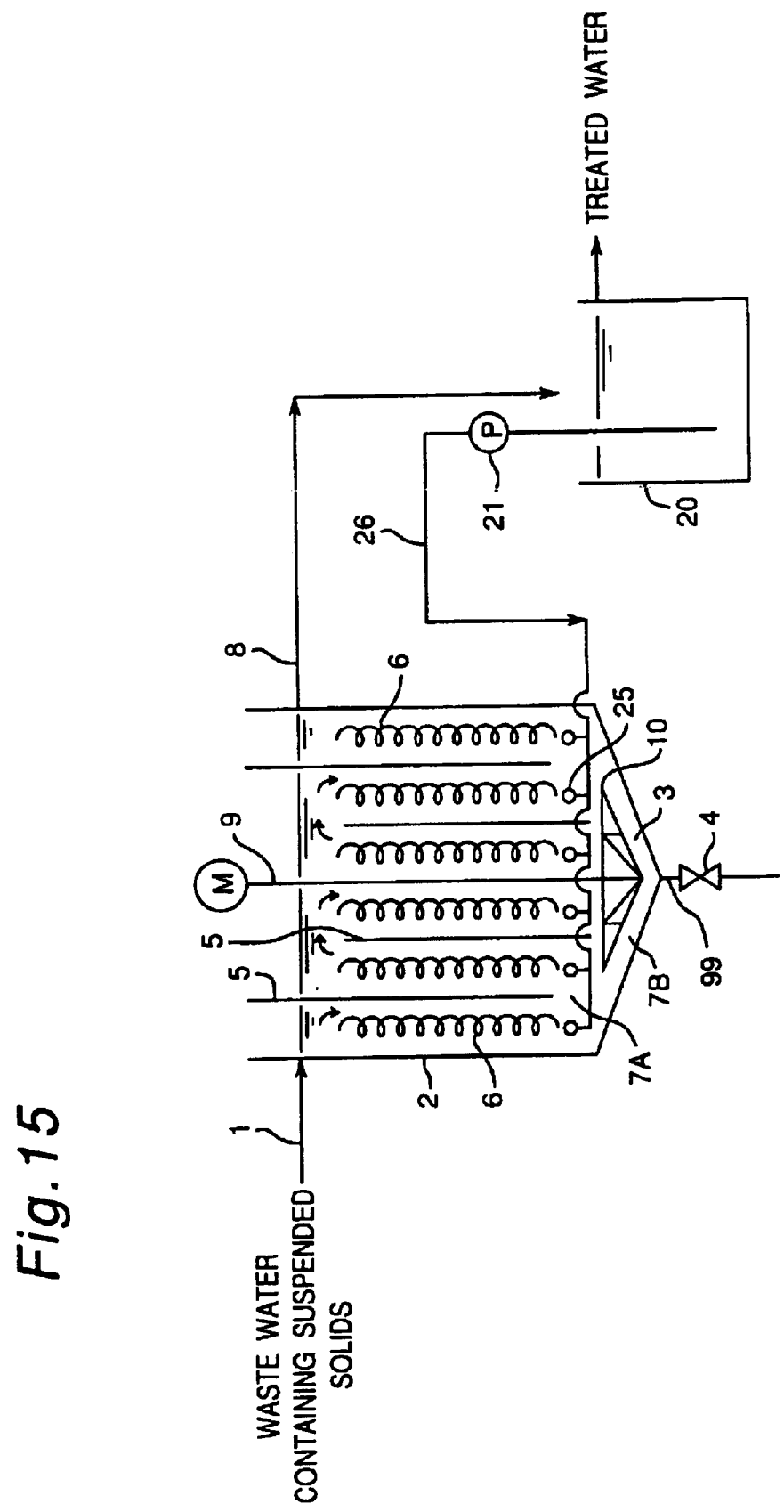
FIG. 15 is a block diagram showing a waste-water treatment system according to a fourteenth embodiment of the invention.

FIG. 15 shows a waste-water treatment system according to a fourteenth embodiment of the invention. The fourteenth embodiment is the same as the second embodiment except that a discharge pipe 25 is disposed below each radial ring-shaped thread structure 6 disposed in each space partitioned by partition plates 5 in the attachment filter tank 2. Therefore, in the fourteenth embodiment, the same component members as in the second embodiment are designated by the same reference numerals and a detail explanation thereof is omitted.

In the fourteenth embodiment, an outflow pipe 8 of the attachment filter tank 2 merges with a backwash water tank 20. The discharge pipe 25 is connected to the backwash water tank 20 with a water distribution pipe 26 via a backwash water tank pump 21. The discharge pipe 25, water distribution pipe 26, backwash water tank pump 21 and backwash water tank 20 constitute water backwash equipment.

According to the fourteenth embodiment, when solids attached to the radial ring-shaped thread structure 6 are digested and then a large amount of suspended solids are attached to the radial ring-shaped thread structure 6, water is discharged from the discharge pipe 25 of the water backwash equipment and the attached solids can be exfoliated and removed by water backwash. Then, the removed suspended solids can be sedimented and removed from the sedimentation section 3 through the drain pipe 99.

By providing the air backwash equipment of the thirteenth embodiment in addition to the water backwash equipment of the fourteenth embodiment, solids attached to the radial ring-shaped thread structure 6 can be removed by both air backwash and water backwash. Consequently, the radial ring-shaped thread structure 6 can be backwashed more efficiently.

FIRST EXPERIMENTAL EXAMPLE

Experimental examples of an attachment filter using an experimental device having the same structure as that of the first embodiment shown in FIG. 1 are explained below as concrete experimental examples.

In a first experimental example, an attachment filter tank 2 having a sedimentation section 3 had a volume of 1 m³. Radial ring-shaped thread structures 6 (Mole Code manufactured by TBR) of 100 mm were installed in the whole attachment filter tank 2 without any gaps therebetween. Waste water containing suspended solids was treated by a device having this constitution. At this time, waste water containing suspended solids that was to be allowed to flow into the attachment filter tank 2 having a sedimentation section 3 had a suspended solid concentration (SS concentration) of 12.3 ppm, while the SS concentration of the treated water that had passed through the attachment filter tank 2 was 5.0 ppm or lower.

SECOND EXPERIMENTAL EXAMPLE

Experimental examples of an attachment filter using an experimental device having the same structure as that of the twelfth embodiment shown in FIG. 13 are explained below as concrete experimental examples.

In a second experimental example, an attachment filter tank 2 having a sedimentation section 3 had a volume of 1 m³. Radial ring-shaped thread structures 6 (Mole Code manufactured by TBR) of 100 mm were installed in the whole attachment filter tank 2 without any gaps therebetween. Activated carbon 27 in powder commercially available from Mitsubishi Chemical Corporation was attached to the radial ring-shaped thread structure 6 and waste water in which a surfactant was dissolved was treated.

In this experimental example, the surfactant concentration of the waste water that was to be allowed to flow into the attachment filter tank 2 having a sedimentation section 3 was 4.2 ppm, while the surfactant concentration of the treated water that had passed through the attachment filter tank 2 having a sedimentation section 3 was 2.0 ppm or lower.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A waste-water treatment system comprising:
   an inflow pipe for introducing wastewater containing suspended solids into the system, an outflow pipe for removing treated water from the system,
   an attachment filter including a packing material located therein to which suspended solids are attached wherein anaerobic microorganisms are propagated in the filter and solids attached to the packing material are anaerobically digested and digested solids realize an increase in specific gravity and descend to a bottom section of the filter, wherein the attachment filter has a negatively charged radical ring-shaped thread structure comprising a plurality of radially extending ring-shaped bodies as the packing material;
   a sedimentation section in said bottom section of the filter where digested solids are collected; and
   a discharge port provided in the sedimentation section of the filter so that digested solids are discharged from the filter via the discharge port located in the sedimentation section at the bottom section of the filter.

2. The waste-water treatment system according to claim 1, wherein the sedimentation section has a sludge collecting function for collecting sedimented sludge.

3. The waste-water treatment system according to claim 1, wherein a rapid filter is installed in a subsequent stage of the attachment filter; and solids suspended in waste water are treated first in the attachment filter and then filtered by the rapid filter.

4. The waste-water treatment system according to claim 3, wherein a coagulating sedimentation device is included; and the attachment filter and the rapid filter are installed in the subsequent stage of the coagulating sedimentation device.

5. The waste-water treatment system according to claim 3, wherein a biological treatment device is included; and the attachment filter and the rapid filter are installed in the subsequent stage of the biological treatment device.

6. The waste-water treatment system according to claim 3, wherein a neutralization device is included; and the attachment filter and the rapid filter are installed in the subsequent stage of the neutralization device.

7. The waste-water treatment system according to claim 1, wherein a rapid filter is installed in parallel to the attachment filter; and solids suspended in waste water are treated in the attachment filter and the rapid filter in parallel.

8. The waste-water treatment system according to claim 1, wherein a material of the radial ring-shaped thread structure is polyvinylidene chloride, polypropylene or vinylon.

9. The waste-water treatment system according to claim 1, wherein a coagulating sedimentation device is included; and the attachment filter is installed in the subsequent stage of the coagulating sedimentation device.

10. The waste-water treatment system according to claim 1, wherein a biological treatment device is included; and the attachment filter having a sedimentation section is installed in the subsequent stage of the biological treatment device.

11. The waste-water treatment system according to claim 1, wherein a neutralization device is included; and the attachment filter is installed in the subsequent stage of the neutralization device.

12. The waste-water treatment system according to claim 1, wherein activated carbon is attached to the packing material composed of the radial ring-shaped thread structures.

13. The waste-water treatment system according to claim 12, wherein waste water to be treated contains a surfactant.

14. The waste-water treatment system according to claim 1, wherein the attachment filter has either air washing equipment or water jet washing equipment or both of them for washing the packing material; and the packing material is backwashed by air or water jet or both of them.

15. The waste-water treatment system of claim 1, wherein a plurality of vertically oriented partitions are provided in the attachment filter, and wherein at least one of the partitions is spaced further from a bottom of the filter than other of the partitions, so that the partitions form a lengthy path through which waste-water travels in the attachment filter.

16. The waste-water treatment system of claim 15, wherein said packing material is located between adjacent vertically oriented partitions.

* * * * *